US009903972B2

(12) United States Patent
Kjos (10) Patent No.: US 9,903,972 B2
(45) Date of Patent: Feb. 27, 2018

(54) SEISMIC CABLE, SYSTEM AND METHOD FOR ACQUIRING INFORMATION ABOUT SEISMIC, MICROSEISMIC AND MECHANICAL VIBRATION INCIDENTS IN A WELL

(71) Applicant: READ AS, Hvalstad (NO)

(72) Inventor: Tore Kjos, Hvalstad (NO)

(73) Assignee: Read AS, Hvalstad (NO)

( * ) Notice: Subject to any disclaimer, the term of this patent is extended or adjusted under 35 U.S.C. 154(b) by 0 days.

(21) Appl. No.: 14/896,998

(22) PCT Filed: Jun. 10, 2014

(86) PCT No.: PCT/IB2014/062101
§ 371 (c)(1),
(2) Date: Dec. 9, 2015

(87) PCT Pub. No.: WO2014/199300
PCT Pub. Date: Dec. 18, 2014

(65) Prior Publication Data
US 2016/0291186 A1 Oct. 6, 2016

(30) Foreign Application Priority Data
Jun. 10, 2013 (NO) .................................. 20130807

(51) Int. Cl.
*G01V 1/40* (2006.01)
*G01V 1/18* (2006.01)
*G01V 1/22* (2006.01)

(52) U.S. Cl.
CPC ................ *G01V 1/40* (2013.01); *G01V 1/189* (2013.01); *G01V 1/226* (2013.01)

(58) Field of Classification Search
CPC ........... G01V 1/40; G01V 1/226; G01V 1/189
(Continued)

(56) References Cited

U.S. PATENT DOCUMENTS 9,038,765 B2 * 5/2015 Goujon .................... G01V 1/40
181/102
2005/0173111 A1 8/2005 Bostick, III
(Continued)

FOREIGN PATENT DOCUMENTS

GB 2492802 1/2013
WO 00/12978 3/2000

OTHER PUBLICATIONS

International Search Report and Written Opinion by the International Searching Authority dated Dec. 15, 2014 in PCT/IB14/62101 Filed Jun. 10, 2014.
(Continued)

*Primary Examiner* — Daniel L Murphy
(74) *Attorney, Agent, or Firm* — Oblon, McClelland, Maier & Neustadt, L.L.P.

(57) ABSTRACT

A seismic sensor cable 10 for lowering into a subterranean well 15 for acquiring information about seismic, microseismic and mechanical vibration incidents in the subterranean well 15, where the device comprises a first portion 20 that is elongate and has a first length with a proximal end and a distal end that are to be lowered down into a lower part of the subterranean well 15, the first portion 20 having a plurality of electric or electromechanical multicomponent seismic sensors 25 that are connected and distributed over large parts of its first length, and wherein the seismic profiling device 10 further comprises a second portion 30 that is elongate and has a second length with a proximal end that is to be held above the subterranean well 15 and a distal end that is to be lowered down into the upper part of the subterranean well 15, said second portion 30 comprising an optical fiber 35 that runs along large parts of said second portion 30, and an electric cable 40 for conducting electric power from the proximal end to said seismic sensors in the first portion 20, and a connector 45 for connecting the
(Continued)

proximal end of the first portion 20 to the distal end of the second portion 30. The invention also comprises a system and a method for acquiring information about seismic, microseismic and mechanical vibration incidents in the subterranean well 15.

7 Claims, 3 Drawing Sheets

(58) Field of Classification Search
USPC .......................................................... 367/25
See application file for complete search history.

(56) References Cited

U.S. PATENT DOCUMENTS

| | | |
|---|---|---|
| 2006/0280412 A1 | 12/2006 | Varkey |
| 2007/0283761 A1 | 12/2007 | Bostick, III |
| 2010/0018303 A1 | 1/2010 | Bostick, III |
| 2010/0238765 A1 | 9/2010 | Grechka et al. |
| 2010/0328096 A1 | 12/2010 | Hache et al. |
| 2012/0046866 A1 | 2/2012 | Meyer et al. |

OTHER PUBLICATIONS

Norwegian Search Report dated Jan. 9, 2014 in Norway Patent Application No. 20130807 Filed Jun. 10, 2013.

\* cited by examiner

SEISMIC CABLE, SYSTEM AND METHOD FOR ACQUIRING INFORMATION ABOUT SEISMIC, MICROSEISMIC AND MECHANICAL VIBRATION INCIDENTS IN A WELL

INTRODUCTION

The invention relates to the acquisition of vertical seismic profiles, VSP, and acoustic well monitoring, and in particular VSP and devices for well monitoring comprising a combination of fibre optic and electrical seismic sensors.

BACKGROUND

The use of optical cable for carrying signals from a seismic tool greatly increases the amount of signals that can be sent. This gives new possibilities in the seismic understanding of reflected signals and new interpretation in order to understand subterranean events. The limitation is the actual number and type of seismic tools that are connected and operated on the electric or fibre optic cable.

New understanding of additional signals on the fibre optic cable caused by seismic reflection signals gives a greater possibility of collecting large amounts of additional information from the fibre optic cable in itself combined with existing seismic tools/gamma ray connected to the electric cable.

By understanding vibration signals on a production well string equipped with a plurality of levels of instruments, caused by inflow of water/gas/oil/sand vibrations, it will be possible to detect what is inside the string and where, as well as monitoring the condition of the well components.

Abandoning working oil/gas wells can be a complicated business in dangerous surroundings where there is a high risk of pollution if leakages occur. A system as described according to the invention can secure such wells after they have been abandoned and will be an important contribution to avoiding undesirable incidents. These incidents include both leakages from the well itself and leakages from geostructures around the well.

Closing down oil/gas fields, in particular in environmentally dangerous areas, will in the future lead to requirements that leakage from shut-down fields should be monitored. The system according to the present invention will be especially suitable in the final phase and after the shutting down of wells and fields. It will give information about how the field develops after shutdown. Gas that may penetrate into the well in the final phase could cause high pressure against the seabed/surface, and gas could penetrate into the geoformation and cause pollution and, at the worst, blowout. The system's microseismic detection of seismic events in the reservoir can give information before such leakages break out and thus avert disasters.

A seismic instrument is able to collect from the earth's surface or the seabed enormous amounts of signals from events down in a reservoir, in contact with the seabed, in close contact with the seabed, in contact with the earth's surface or in contact with the well wall in a well. The problems of bringing the signals up to the surface have previously been limited by the capacity of the cable with feedthrough through the wellhead etc. A marked increase in transmitted signal amount can be obtained by using a fibre optic cable.

Geophones have traditionally sent signals via electric cable as three-component measurements. However, more modern geophones have fibre optic signals that require fibre optic cables and are also able to collect three-component measurements.

Fibre optic cables are also able to collect seismic signals via fibre optic signals as one-component measurements. By means of processing equipment, all these signals can be combined to improve the seismics qualitatively and quantitatively.

A fibre optic cable is able to respond to sound signals, vibrations, temperature etc. Light signals that are sent down in the fibre by means of the fibre optic transmitter-receiver (hereafter called "fibre optic gun" or simply "gun") are reflected or returned by a signal that is analysed. The signals can also be reflected or in some other way returned from one or more given points on the cable, e.g., corresponding to one-meter intervals along the cable. The cable responds to changes such as sound, vibrations, temperature etc. The collected data from the cable point can be compared with the signals from the instrument, and information of both a qualitative and quantitative nature can thus be drawn out from this combination.

A seismic instrument comprising at least one electrical or electromechanical multicomponent seismic sensor, such as a geophone, can take in signals from an event in three directional components (x, y, z), i.e., that the event can be detected with respect to where it comes from. With reflections from a specific geological structure and collection using several such seismic instruments, it can be determined where this structure is relative to the location of the seismic instruments. The signal that creates reflected signals is traditionally an acoustic signal from a seismic source, as, for example, a dynamite shot, and airgun shot or an ignition signal from an electrical source. Similarly, it is possible to locate an event in a reservoir from an earthquake, or from smaller movements that may correspond to a minor earthquake that could be caused through gas leakage, or by gas or by water front movements caused by gas, water and movements of the oil front in a reservoir.

The object of the invention is to find the condition of a well or the well elements with greater precision and/or with a lower use of resources than is previously known.

The present invention provides a technical solution for obtaining and/or processing seismic signals or acoustic signals emitted from a well formation or well installation.

The present invention provides apparatus and/or methods for seismic signal capture, with combinations in one and the same well seismic cable of seismic multicomponent instruments in an electrical portion and distributed fibre optic seismic sensors in a fibre optic portion, and with combinations of the signals detected by seismic multicomponent instruments in the electrical portion of the cable and the signals detected by the fibre optic portion of the cable.

The signals are processed and interpreted such that the events from the reservoir that are detected using multicomponent seismic sensors are amplified and expanded by the signals from a fibre optic seismic sensor cable, both qualitatively and quantitatively (in terms of area).

In accordance with an aspect of the invention, the condition of the well and/or well elements is found by analysing the mechanical movements of the well tubing caused by production vibrations picked up by the signals that the seismic instruments and fibre cable send out.

In accordance with another aspect of the invention, there is provided condition monitoring of the well, inflow data such as amount and composition in the different zones by analyses using a plurality of instruments at different levels in the well and signals from the fibre optic cable actually in the well.

In accordance with an aspect of the invention, it is envisaged that measurements in a well are carried out easily by following a slug of gas on its journey up through a well tubing and, through analysis of the vibration signals, seeing how fast this slug moves so as to determine the volume flow in the well. Through such vibration analyses it is found where gas, water and oil enter the well, and how much, and optionally also what composition is found in the different zones, for example, by utilising the fact that water, gas, oil and sand have different density. Deflection of the well tubing occurs in the perforation zone, and in accordance with an aspect of the invention, it comprises detection and analysis of the well tubing vibrations that may be different depending on the support and deflection of the well tubing and on volume flow and composition.

In accordance with an aspect of the invention, it comprises registering the well tubing vibrations at a plurality of levels, and an analysis of where these vibrations come from, which gives information about volume flow, composition and zone in which the volume flow enters the well tubing.

The inventive system is intended to be realised by using different seismic detection means as, for example, means that are described in US 2012/0162639 A1 in the name of Silixia, published on 28 Jun. 2012. For example, in realising the present invention, use is made of technology as disclosed in paragraph 0017, which describes the use of acoustic sensors.

According to the present invention, a new solution is provided involving a combination of electric signals, mechanical vibration signals and fibre optic signals.

According to a further aspect of the present invention, a solution is provided involving the utilisation of signals that in previously known solutions are removed from the signals for a seismic profile in order to make the profile clearer, i.e., the signals which in previously known solutions for acquiring a seismic profile are the so-called noise signals. In accordance with the invention, the noise signals' content of major mechanical vibration signals is exploited, and used to detail seismic events or to monitor the condition of the well and well elements or for production volume flow measurements and composition measurements.

In the said Silixia document, paragraph 0088 describes a chain of sensors across the perforation zone (drainage zone), but it is well known that cables across the actual perforation zone are undesirable in a well, in particular because of maintenance. The present invention comprises, however, a solution with sensors adapted for mounting above the perforation zone, which acquire signals that are descriptive for inflow and composition in the perforation zone, and which can comprise processing that obtains measurement of inflow and composition in the perforation zone, without installing cable across the actual perforation zone. The present invention advantageously uses detection of mechanical vibrations to analyse this.

BRIEF DESCRIPTION OF THE INVENTION

A system in accordance the present invention for acquiring information about seismic, microseismic and mechanical vibration incidents in a subterranean well comprises:
a seismic sensor cable having a first portion that is elongate and has a first length with a proximal end and a distal end that are to be lowered down into a lower part of the subterranean well, the first portion having a plurality of electrical or electromechanical multicomponent seismic sensors that are connected and distributed over large parts of its first length, and wherein the seismic sensor cable further comprises:
a second portion that is elongate and has a second length with a proximal end that is to be held above the subterranean well and a distal end that is to be lowered down into the upper part of the subterranean well, said second portion comprising:
an optical fibre that runs along large parts of said second portion, and an electric cable for conducting electric power from the proximal end to said seismic sensors in the first portion, and where the system further comprises:
a connector for connecting the proximal end of the first portion to the distal end of the second portion, and
a fibre optic transmitter/receiver connected to the proximal end of the second portion and which is adapted to receive signals from said seismic sensors in the first portion, and also adapted to register optical signals that represent other seismic signals which are detected on the optical fibre that runs along large parts of said second portion.

The invention is also described by a method for acquiring information about seismic, microseismic and mechanical vibration incidents in a subterranean well and a seismic sensor cable that makes the method possible.

Additional aspects of the invention are described in the set of claims.

DETAILED DESCRIPTION AND REALISATION EXAMPLES

The invention is described in more detail below with the aid of realisation examples, and with reference to the attached drawings wherein.

Figure 1:
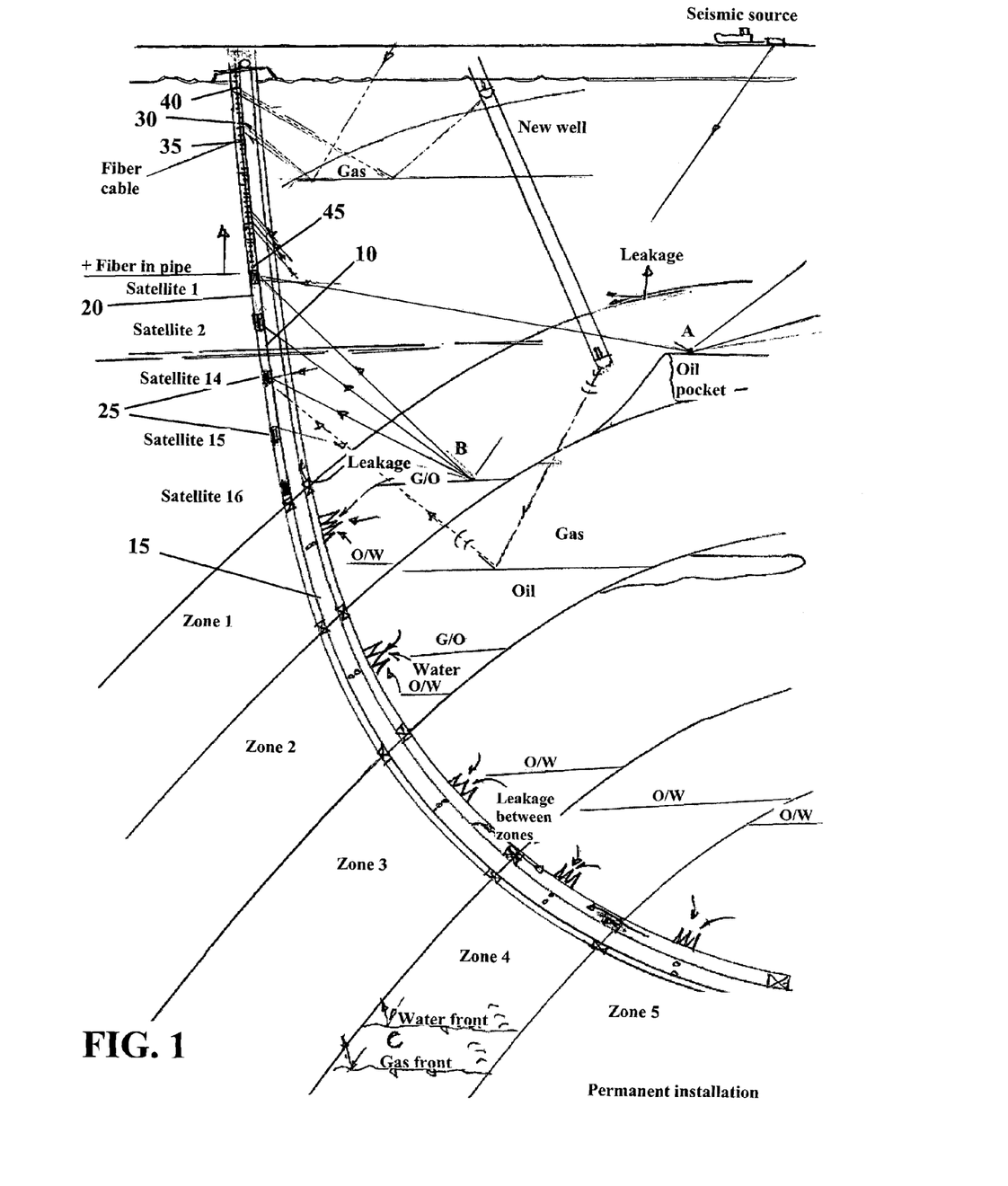
FIG. 1 is a first schematic side view of a first well situation that illustrates a subterranean-installed seismic cable in accordance with the present invention.

FIG. 1 shows a side view of a first situation in a subterranean well 15 with an example of a realisation of the invention in an application in a permanent installation of a combined fibre optic and electric seismic sensor cable 10, comprising a combination of a lower first portion 20, which in FIG. 1 is located below the horizontal line marked "+Fiber in pipe", with multicomponent seismic sensors 25, and an upper second portion 30, which in FIG. 1 is located above the horizontal line marked "+Fiber in pipe" and is marked "fiber cable", with optical fibre cable 35 and electric cable 40 that bring the signals up to the surface at high transmission rate and provide electric power to the geophones and associated electronics. The system is well suited for fixed installations and VSP operated on a wireline (well cable with wire reinforcement). In addition, the fibre cable is adapted for use as a single component satellite (geophone), where a fibre optic gun connected to the upper end of the part marked "fiber cable" is adapted to read off these single component signals that are picked up by the optical fibre cable, preferably with a vertical resolution in a range that corresponds to from at least one single component satellite every meter in the upper portion of the cable to at least one single component satellite every tenth meters in the upper portion of the cable. Similarly, the receiver for the signals from the multicomponent sensors in the lower portion is adapted to read off the signals from each of the multicomponent satellites, which are preferably distributed in a traditional manner in the lower portion of the combined seismic sensor cable with a spacing that gives a vertical resolution in a range corresponding to from at least one multicomponent satellite every tenth meter to at least one single component satellite every fortieth meter in the lower portion of the cable. The transition between the lower portion and the upper portion comprises a connector 45 for connecting the proximal end of the first portion 20 to the distal end of the second portion 30, and preferably a suitable signal converter unit that converts electrical signals from the multicomponent seismic sensors 25 of the first portion 20 into optical signals that are transported on the optical fibre in the upper portion up to the receiver for the signals from the multicomponent seismic sensors 25. According to an embodiment, the multicomponent seismic sensors 25 are electrical or electromechanical three-axis seismic sensors.

A combined fibre optic and electric seismic sensor cable according to the invention can be composed of a string comprising one or more levels of satellites/geophones/fibre optic cable that are embedded or are intact after the well has been shut down, and combined signals from seismic events and mechanical vibrations are used to monitor the well and the condition of the reservoir after the well has been shut down.

A combined fibre optic and electric seismic sensor cable according to the invention may be installed in a producing subterranean well and positioned above a drainage zone in the producing well and adapted to measure volume flow through detection of vibration readings from a slug in a slug flow on passing two or more levels.

A combined fibre optic and electric seismic sensor cable according to the invention may be composed of a string comprising a plurality of levels of satellites/geophones/fibre optic cable installed in a producing subterranean well above a drainage zone and adapted to measure the volume flow through detection of vibration readings from slug flow further down in the well than installed levels and cable in the well.

A combined fibre optic and electric sensor seismic cable according to the invention may be composed of a string comprising a plurality of levels of satellites/geophones/fibre optic cable installed in a subterranean well and adapted to measure, through detection of vibration readings from slug flow further down in the well, where or in which zone inflow/outflow is taking place.

A combined fibre optic and electric seismic sensor cable according to the invention may be composed of a string comprising a plurality of levels of satellites/geophones/fibre optic cable installed in a subterranean well above a drainage zone and adapted to measure, through detection of vibration readings from slug flow further down in the well, the oil/water/gas/sand content of the inflowing volume flow.

A combined fibre optic and electric seismic sensor cable according to the invention may be composed of a string comprising a plurality of levels of satellites/geophones/fibre optic cable installed in a subterranean well and adapted to augment, through detection of vibrations on the production pipe from seismic events in the reservoir or from seismic sources, the area and quality of seismic signals.

The invention further comprises a system for acquisition of information about seismic, microseismic and mechanical vibration incidents in a subterranean well 15, the system comprising a seismic sensor cable 10 having a first portion 20 that is elongate and has a first length with a proximal end and a distal end that are to be lowered down into a lower part of the subterranean well 15, the first portion 20 having a plurality of electrical or electromechanical multicomponent seismic sensors 25 that are connected and distributed over large parts of its first length. The seismic sensor cable 10 further comprises a second portion 30 that is elongate and has a second length with a proximal end that is to be held above the subterranean well 15 and a distal end that is to be lowered down into the upper part of the subterranean well 15, said second portion 30 comprising an optical fibre cable 35 which runs along large parts of said second portion 30, and an electric cable 40 for conducting electric power from the proximal end to said seismic sensors in the first portion 20.

The system further comprises a connector 45 for connecting the proximal end of the first portion 20 to the distal end of the second portion 30, and a fibre optic transmitter/receiver connected to the proximal end of the second portion 30 and that is adapted to receive signals from said seismic sensors 25 in the first portion 20, and also adapted to register optical signals that represent other seismic signals detected on the optical fibre cable 35 that runs along large parts of said second portion 30.

In an embodiment, the system further comprises a signal converter unit that converts signals from the multicomponent seismic sensors 25 of the lower first portion 20 into optical signals that are transported on the optical fibre in the upper second portion 30 up to the said fibre optic receiver.

The invention further comprises a method for acquiring information about seismic, microseismic and mechanical vibration incidents in a subterranean well 15 that is characterised by arranging a combined fibre optic and electric seismic sensor cable 10 in the subterranean well 15, and then registering seismic signals using a plurality multicomponent geophones at a plurality of levels in a lower first portion 20 of the seismic sensor cable. Seismic signals are subsequently registered using single component fibre optic distributed sensors at a plurality of levels in an upper second portion 30 of the seismic sensor cable. Lastly, combined signals are processed and analysed for seismic events registered in said lower 20 and upper portion 30.

In an embodiment of the method, combined signals are processed and analysed for microseismic events in the reservoir to detect the movement of gas, water and oil fronts in order to provide information about possible leakages in the subterranean well 15 or geostructures around the subterranean well 15.

In another embodiment of the method, combined signals are processed and analysed for mechanical vibrations on the well string/casing to detect the subterranean well 15 and the condition of the well elements.

In yet another embodiment of the method, combined signals are processed and analysed for vibrations on the well string/casing and/or to detect inflow volume, proportion of gas/oil/water/sand in the volume flow, and where on the well string the volume flow flows in.

In still another embodiment of the method, combined signals are processed and analysed from a collection of acoustic data on a wireline string operated as VSP.

With the inventive solution, it is easy to install satellites along a well casing above the inflow zone, and it avoids having to run lines through the drainage or perforation zone, which would otherwise have complicated the installation considerably. The system according to the present invention is therefore advantageously adapted to comprise a plurality of satellites at a given spacing further up in the well than the drainage zone, and the connections to the drainage zone are in an advantageous embodiment intended to be formed solely by mechanical connections.

In an advantageous embodiment, the satellites comprise in particular multicomponent geophones, designed for good connection with the geostructure. The system will thus primarily pick up seismic signals either as signals originating from a seismic gun on the surface or signals that are formed by microseismic activity, such as small earthquakes from minor changes in the geostructure, such as movements of the water/gas/oil front, leakage in the reservoir, abandoned oil pockets. Secondarily, the satellites should pick up mechanical vibrations in the well string that are caused by inflows into the well string, composition and zone, leakage in the well, failure of zone isolators, corrosion etc.

In the case where a seismic signal is produced, for example, by the use of a seismic gun on the surface, the sound waves pass downwards in the ground and are reflected back, for example, on a liquid/gas surface. On a plurality of "shots" from the seismic gun, this surface (point B) in FIG. 1 will emerge as a surface of seismic signals that are picked up by the VSP seismic cable, and it will be possible to conclude by analysis that this is a gas/liquid surface. A plurality of satellites gives better seismics, i.e., more signals pick up the same object. The three-dimensional multicomponent satellites obtain signals that give the position of the object. The one-dimensional satellites, here also referred to as single component satellites, on the cable help to increase the number of signals that strike the object that is picked up. The quality of the collection of signals from the seismic sensors is thus enhanced, even though the one-dimensional satellites do not indicate more than a single direction coordinate. If this firing is carried out at intervals and the results from the firing at different intervals are compared, it can be seen how this gas/liquid surface has moved. It gives an indication of how the reservoir is emptying. If signals from the seismic sensors indicate that the same liquid surface still in part remains, this is a sign that an oil pocket (point A) has occurred which cannot be drained. This becomes a production that must be drained using a deviated well or a new well. A new well can in part be controlled on the basis of signals from existing satellites by using microseismics or reflections from the well drilling. This existing system of satellites will thus be a geo-risk monitoring of the drilling, and be particularly important in cases of shallow gas pockets which, when uncontrolled, can give dangerous blow-out situations.

Figure 3:
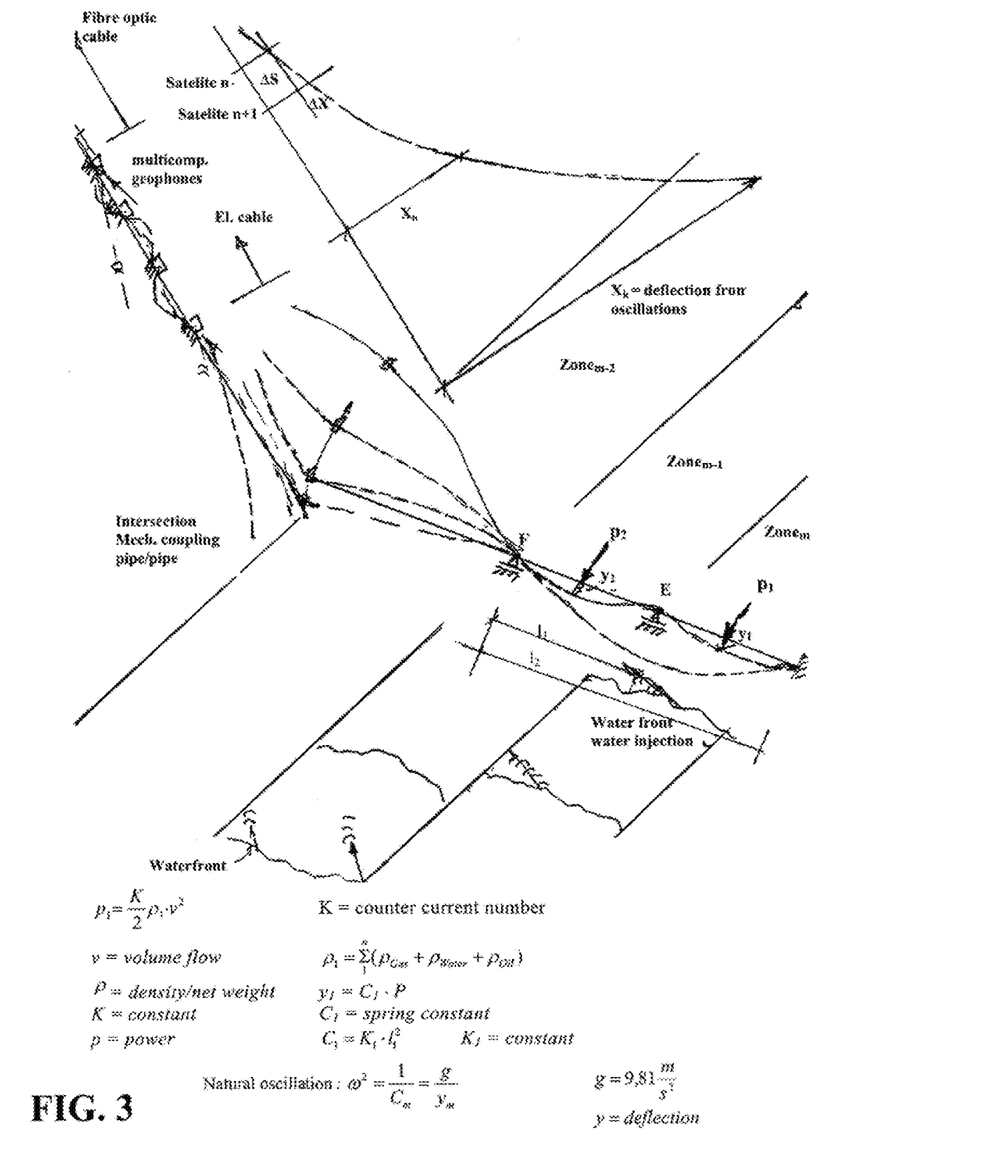
FIG. 3 is a second schematic view of a third well situation that illustrates a subterranean-installed seismic cable for well monitoring using the present invention.

In reservoirs with pressure support in the form of water or gas or combinations thereof, it will be necessary to monitor how the fronts move. When such a front moves, small earthquakes occur which are registered in the satellites. This is called microseismics. By following the signals from the earthquakes, which in FIG. 1 are indicated, for example, in the area C, it is possible to see how the front moves and how effective a pressure support this is. If a seismic gun is fired on the surface at time intervals, signals obtained by the system according to the invention can show how the front moves over time. As a front of water or gas moves into the production tubing, the vibrations in the well string will usually change. The vibrations or oscillation in the well string, which is illustrated in more detail in FIG. 3, is dependent on the composition of water/oil/gas/sand, change of density, i.e., force p that enters the well. By analysing several satellites in the system further up the string, it is possible to give indications of the amount of gas/oil/water by means of a mechanical vibration analysis and find where the components enter the drill string and in what quantity.

The total of the components can be checked on the surface, and the zone in which the pressure support enters the well is detected through microseismics and time difference seismic analyses of the pressure support front.

The system according to the invention will therefore be able to give valuable reservoir information through two different methods, seismic-determined front movement and mechanical vibration analyses.

In a string of geophones downhole at different levels, which is provided by the invention's seismic cable, there is a marked difference between signals from a seismic event and noise from the production string. Such a well situation is illustrated schematically in FIG. 3, where a solid straight line drawn through supports points E and F for a production string indicate an ideal line for an unloaded string without mass, whilst the broken lines indicate real string form with deflection and vibration swing, given by the string's mass and buoyancy, which may be determined by, inter alia, the medium that the string transports at any given time, the surrounding medium, and the quality and characteristics of the supports. As regards processing and analysis, an attempt is made in the known solutions to remove the noise from the production string from seismic signals in order to obtain clearer seismic events. According to the present invention, this noise is captured and utilised in respect of its content of a great deal of information about vibrations caused by inflow of gas/oil/water/sand into the well string. This noise is analysed according to an aspect of the invention using vibration-technical analyses. With a plurality of measurements along the well path (several levels), which are provided by the invention's system and seismic cable, it is possible to see where the vibrations occur and how they are composed. With changes in water/gas/oil/sand compositions, the vibrations will change. It is therefore possible to give information about the composition that flows in, the zone into which it flows and the volume flow.

In wells that do not have volume flow measurements, the system according to the invention will be an "add on" to the existing well without complications. No cables need pass in the inflow zone, as all satellites are placed higher up. At the same time, this system will be capable of giving valuable information for correct operation of the reservoir with higher production as a result.

Mechanical monitoring of the actual well string and components can be done using the inventive system. In accordance with the invention, a series of satellites in an upper portion of the invention's seismic cable installed higher up in the well string obtain seismic signals which, through mechanical vibration analysis, give indications of the failure of zone isolators, for example, zone isolators that are illustrated at zone boundaries, which, for instance, are located at points E and F, respectively, in FIG. 3, or indications of corrosion of the well string, for example, a corrosion area which can also be illustrated by point F in FIG. 3, which causes change of spring constant c that helps to determine the vibration characteristics of the well string. For instance, in accordance with the invention, the failure of the zone isolator is detected through detection of signals that propagate in the well and analysis which demonstrates a change in deflection and resonant frequency of the well tubing which are altered. According to the invention, mechanical vibration analysis is provided using a plurality of satellites/measuring points further up in the well and measurements in the fibre cable's satellites furthest up in the well string and information about the condition of the well string is obtained. As illustrated in FIG. 3, the same satellites in the seismic cable can detect acoustic signals that have come from areas with reflectors or microseismic events, for example, from what is marked in FIG. 3 as "waterfront".

It is further intended that the invention, in an embodiment, will comprise detection and analysis of signals from mechanical couplings in such a well string that occur where a liner and a casing knock against each other because of vibrations.

The readings on the satellites can be read off in the collected data. If a slug flow which, for example, can be a gas slug or a sand slug, occurs in zone 1, vibrations created by the slug will be read off on the satellites 1 to nine in the upper portion of the inventive seismic cable. The analysis determines how the readings are reduced from level n to level 1, and the speed of reduction is determined to decide how far away the slug flow event is in relation to the seismic cable's satellites. As the slug passes level n, a new maximum reading will be seen in the combined signals from these satellites. This maximum reading is repeated in each of the different levels as the slug passes respective levels n to 1. Through the invention's analysis, the speed of the slug will be calculated, and volume flow is thus intended to be calculated on the basis of measurement of time between the maximum reading for each satellite level and that the distance between them is known. For example, the time from the first reading until maximum reading is measured at satellites n to 1, and through this the formation of the slug can be calculated to be in zone 1.

In accordance with another aspect of the invention, detection of pulses is made where inflow into the reservoir pulsates, and the zone in which inflow occurs is calculated by analysing the form and spacing of the pulses. Vibration type is determined and gives measurements of the composition of the inflowing medium. By signal detection using the invention's seismic cable system of information that is found in what traditionally has been filtered away as noise and the vibration analysis, it can be indicated what amount and composition flows into the well and into which zone, without having measuring instruments directly in the drainage zone. Improvement of measurements is also obtained through the invention's seismic cable system in an embodiment which comprises satellites designed to be mounted directly on the production tubing.

Figure 2:
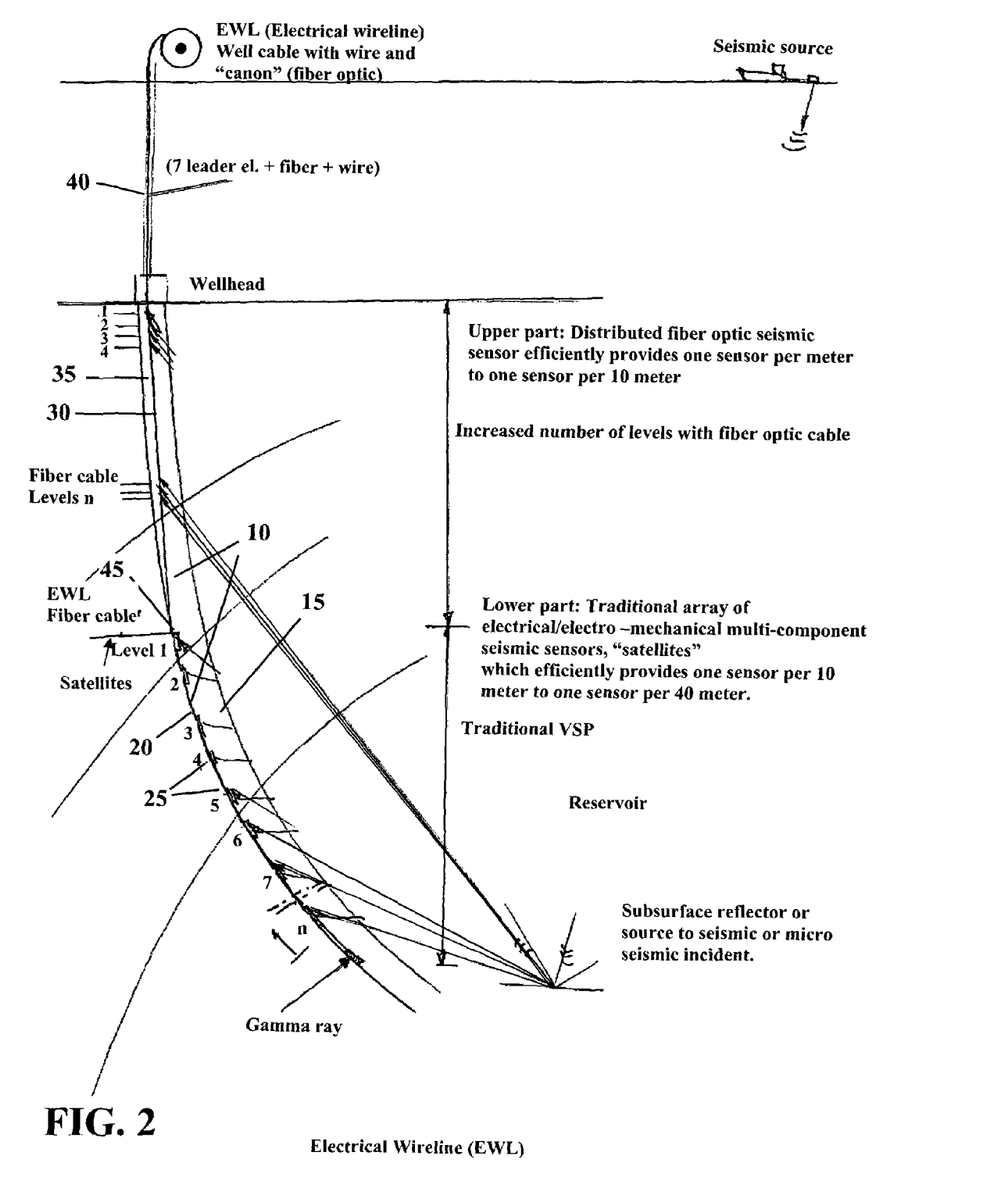
FIG. 2 is a second schematic side view of a second well situation that illustrates a subterranean-installed seismic cable in accordance with the present invention.

A combination of fibre cable and satellites is also combined on "electrical wire line", EWL, as illustrated in FIG. 2, comprising electric multicable, typically seven electric cables, with wire that is run in open wells, such as exploratory wells, and which is run in completed wells, such as production wells, injection wells and observation wells. In open wells, the seismic solution is usually a VSP solution (Vertical Seismic Profiling). The satellites are often pressed against the well wall such that good contact is formed.

The seismic cable of the present invention with a plurality of satellites gives greater imaging and improved seismics. The number of signals per object increases. The satellites in the lower portion of the cable are preferably three-dimensional multicomponent geophones or similar instruments, which obtain signals that are dependent on direction and position of the object that gives off the seismic signals. Together with a seismic fibre cable in the upper portion which with the gun can only read off one-dimensional seismic data, this arrangement, combined with the three-dimensional data of the satellites, gives more signals per object. This increases the quality of the seismics and enlarges the area of seismic imaging without causing significant complexity or costs.

Electric signals and electrical power supply to critical instruments in a VSP operation, as, for example, gamma ray, may be necessary depending on use, also for the cases in which a VSP operation is to link surface seismics to depth information from VSP. Today, instruments such as gamma ray are only electrically powered. Without the combination of electric signals and fibre optic signals, a VSP operation may be of less value. Compared with previously known solutions, the inventive solution, which obtains fibre optic seismic signals at high density, augments the number of single component signals by a thousand levels, thereby enhancing the quality of a VSP whilst increasing the area for single component measurements. The area increase in the reservoir or the area that will be illuminated is indicated in FIG. 2 where VSP Fibre shows the increased area. With the inventive combination of fibre cable in the upper portion used over a conventional VSP string of 4000 m, the number of levels will be increased from around 40 to around 4000.

A system in accordance with the invention with a plurality of levels of satellites/geophones/electrical instruments and with fibre optic and electric cables will give more exact imaging and velocity information than other available systems because there is a unique combination of one or more multicomponent measurements with fibre optic cables, which gives a greater lateral surface (in depth and direction) than the electrical systems give, and better dynamic resolution from the electrical sensors than fibre measurement can give alone. Gamma ray gives the necessary depth correlation with logs/references that are not present in an optical system alone.

The signals that are collected as described in the document referred to above belonging to Silixia, US 2012/0162639 A1 are only single component signals (i.e., only one of the directions x, y and z) and alone are not usable in a VSP for achieving the object of the present invention. By comparing the signals from the fibre optic cable with electric cable/signals from multicomponent geophones, mechanical vibrations and gamma ray according to the solution of the present invention, a new VSP is obtained through processing and interpretation such that area cover and quality are improved.

When a well/reservoir is to be shut down, the system according to the invention can continue to monitor events down in the reservoir. This can predict leakages and thus prevent disasters. Instruments/satellites/geophones/fibre optic cable are embedded in the well and remain intact after shutdown. A combination of signals and vibrations give corresponding information about the condition of the well/reservoir.

In real applications, instruments that are required to give depth information for surface seismics are electrical. It is therefore advantageous to provide a system that can handle the combination of electric and fibre optical signals, and process and interpret these signals together.

The invention claimed is:

1. A seismic sensor cable system for acquisition of information about seismic, microseismic and mechanical vibration incidents in a subterranean well, the system comprising:
   a seismic sensor cable including:
      a first portion of the seismic sensor cable that is elongate and has a first length with a proximal end and a distal end that are to be lowered into a lower part of a subterranean well, the first portion having a plurality of electrical or electromechanical multi-component seismic sensors that are connected and distributed over large parts of its first length;
      a second portion of the seismic sensor cable that is elongate and has a second length with a proximal end that is to be held above the subterranean well and a distal end that is to be lowered down into an upper part of the subterranean well, wherein the second portion includes an optical fiber cable with single component fiber optic distributed sensors running along large parts of the second portion, and an electric cable for conducting electric power from the proximal end of the second portion to the seismic sensors in the first portion; and a connector configured to connect the proximal end of the first portion to the distal end of the second portion;

a signal converter connected to the proximal end of the first portion of the seismic sensor cable and to the distal end of the second portion of the seismic sensor cable, wherein the signal converter is configured to convert electric signals from the multicomponent seismic sensors of the first portion into optical signals that are transported on the optical fiber cable in the second portion;

a fiber optic transmitter/receiver connected to the proximal end of the second portion and that configured to receive signals from the seismic sensors in the first portion, and further configured to register optical signals that represent other seismic signals that are detected on the optical fiber cable that runs along large parts of the second portion; and a processor configured to process and analyze combined signals for seismic events registered in the first portion and the second portion of the seismic sensor cable.

2. The seismic sensor cable system according to claim 1, wherein the electrical or electromechanical multicomponent seismic sensors are electrical or electromechanical three-axis seismic sensors.

3. A method for acquiring information about seismic, microseismic and mechanical vibration incidents in a subterranean well, the method comprising:
arranging a combined fiber optic and electric seismic sensor cable in the subterranean well;
registering seismic signals using a plurality of multicomponent geophones at a plurality of levels in a lower first portion of the seismic sensor cable;
registering seismic signals with single component fiber optic distributed sensors at a plurality of levels in an upper second portion of the seismic sensor cable; and
processing and analyzing combined signals for seismic events registered in the lower first portion and the upper second portion.

4. The method according to claim 3, wherein the combined signals are processed and analyzed for microseismic events in a reservoir in order to detect movements of gas, water and oil fronts in order to provide information about possible leakages in the subterranean well or geostructures around the subterranean well.

5. The method according to claim 3, wherein the combined signals are processed and analyzed for mechanical vibrations on a well string/casing in order to detect the subterranean well and a condition of well elements.

6. The method according to claim 3, wherein the combined signals are processed and analyzed for vibrations on a well string/casing and/or in order to detect inflow volume, proportion of gas/oil/water/sand in the volume flow, and where on the well string the volume flow flows in.

7. The method according to claim 3, wherein the combined signals are processed and analyzed from a collection of acoustic data on a wireline string operated as Vertical Seismic Profiling (VSP).

* * * * *